United States Patent [19]

Hirota et al.

[11] 4,319,244

[45] Mar. 9, 1982

[54] SHORT-RANGE DOPPLER RADAR

[75] Inventors: Yukitsugu Hirota, Yokohama; Yoichi Kaneko, Tokorozawa; Kenji Sekine, Hinode; Akira Endo, Katsuta; Katsuhiro Kimura, Tokyo, all of Japan

[73] Assignees: Nissan Motor Co., Ltd.; Hitachi, Ltd., both of Tokyo, Japan

[21] Appl. No.: 112,744

[22] Filed: Jan. 17, 1980

[30] Foreign Application Priority Data

Jan. 22, 1979 [JP] Japan .................................. 54-4874

[51] Int. Cl.³ ............................................. G01S 13/58
[52] U.S. Cl. .................................. 343/8; 343/5 DD; 343/5 HM; 343/5 TM
[58] Field of Search ........ 343/8, 5 DD, 5 HM, 5 TM

[56] References Cited

U.S. PATENT DOCUMENTS 4,217,585  8/1980  Fishbein et al. ............ 343/5 HM X

*Primary Examiner*—T. H. Tubbesing
*Attorney, Agent, or Firm*—Craig and Antonelli

[57] ABSTRACT

In a Doppler radar system for measuring the velocity of a vehicle, such as an automobile, in order to lessen interference with external electric wave appliances, such as radios and televisions, caused by transmitting microwaves, one of the higher harmonics generated from a mixer diode driven by the fundamental waves of a local oscillator is selected by a filter for transmission and is used as the transmission output wave, whereby the power of the transmission waves is remarkably reduced in comparison with the mixer driving power.

27 Claims, 2 Drawing Figures

SHORT-RANGE DOPPLER RADAR

BACKGROUND OF THE INVENTION

1. Field of the Invention

This invention relates to a short-range Doppler radar; and more particularly, it relates to a Doppler radar system of the type which may be carried by a vehicle, such as an automobile, or any vehicle in a broad sense so as to measure the velocity thereof by radiating a microwave signal and detecting the Doppler frequency shift undergone by the reflected signal. Especially, it relates to the construction of a transmitting and receiving device for microwave signals.

2. Description of the Prior Art

In short-range radars, such as a Doppler radar system for measuring the true ground speed of an automobile, the transmission power should be kept to a very low power level (1–10 $\mu$W or less) from the viewpoint of the possible influence of such signal on other radio equipment which may be within the range of the radar signal. On the other hand, the receiving sensitivity of the system ought to be made as high as possible to ensure a high measuring accuracy.

A Doppler radar utilizing microwave signals is so constructed that in order to detect the Doppler frequency shift of received reflected waves, a mixing circuit which mixes the received waves and local oscillation waves is provided so as to detect the difference component of the two frequencies from the output thereof. In order to make a device for use in an automobile as small in size as possible, a transmitter/receiver for the microwave signal is constructed of a microwave integrated circuit, and a mixer diode is used as the mixing circuit.

Usually, in order to operate the mixer diode at a high sensitivity, approximately 1 mW needs to be applied as a driving power. In this case, a special balanced mixer or the like comprising a pair of diodes may be employed for the purpose of reducing the microwave leakage power. However, there has been the problem that when the characteristics of the two diodes which constitute the balanced mixer degrade at an unequal rate, the transmission power varies sharply.

SUMMARY OF THE INVENTION

It is accordingly the principal object of this invention to provide a Doppler radar system which produces a microwave signal with a low level transmission power and simultaneously exhibits a high receiving sensitivity.

Another object of this invention is to provide a Doppler radar system which produces a microwave signal having a stable transmission power even when the characteristics of the mixer diode and other circuit constituent elements thereof have degraded with time.

In order to accomplish these objects, the microwave Doppler radar system according to this invention is constructed of an oscillator, a frequency multiplier device which is driven by a fundamental frequency component of said oscillator, a filter circuit which selects one of a plurality of higher harmonic components generated by said frequency multiplier device, an antenna which radiates the selected frequency component to the outside and which receives reflected waves of the radiated frequency component, and a circuit which takes out a low frequency component generated when the received reflected waves are applied to said frequency multiplier device.

More specifically, the frequency multiplier device is constructed of a mixer diode or a Gunn oscillator device. A plate including a microwave integrated circuit which is formed of elements, such as the mixer diode and micro strip lines for applying the output of the oscillator to the element and for taking out the low frequency component in the form of a mixing output from the element is installed inside a metallic package; and, a window is provided in a part of the package so as to couple the window to a horn antenna.

According to the Doppler radar system of this invention, notwithstanding the fact that the mixer diode forming the frequency multiplier device is driven with a high power as is necessary for its operation, the power of the microwave signal to be radiated can be remarkably reduced in comparison with with the driving power of the mixer because one of the higher harmonics of the mixer diode is selected by the filter and radiated rather than the fundamental frequency.

The above-mentioned and other objects and features of this invention will become more apparent from the following description when taken in conjunction with the accompanying drawings.

DESCRIPTION OF THE PREFERRED EMBODIMENTS

Figure 1:
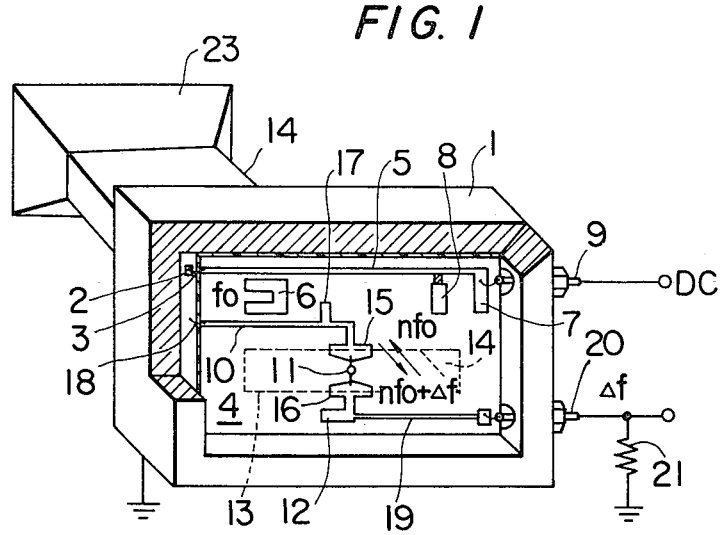
FIG. 1 is a perspective view showing the construction of an embodiment of a short-range Doppler radar according to this invention.

FIG. 1 shows a package (Doppler radar module) 1 made of a metallic wall in which a dielectric substrate 4 forming a micro-integrated circuit is installed, the wall being partially broken away in order to display the interior.

A fundamental wave oscillator portion is constructed of a Gunn diode 2 which is disposed within the package, and a bias circuit which consists of a direct current power supply DC, a connector 9 and a strip line 5 formed on the substrate 4, the three components being connected in series in order to apply a bias voltage as necessary for the oscillation of the Gunn diode. The oscillation signal of the Gunn diode 2 has its fundamental frequency $f_o$ determined by the strip line 5 and a half wavelength bending type strip line resonator 6. The power of the fundamental wave oscillation signal is applied to a mixer diode 11 via a strip line 10.

A low-pass filter bias circuit 7 and a no-reflection terminating ciruit 8 for the fundamental wave prevent higher harmonic components and the fundamental wave component from passing onto the DC bias side. In addition, the back surface of the substrate 4 is covered with a conductive layer, except for a cutout portion 13.

The mixer diode 11 functions as a frequency multiplier device, and when driven by the fundamental wave $f_o$, it generates a higher harmonic signal which is an integral number of times higher in frequency than $f_o$. In general, the power of the higher harmonic signal lowers as the order of the harmonic increases.

Since the wall of the package 1 and the conductor formed on the rear surface of the substrate 4 at a location corresponding to the position of the mixer diode 11 are removed as indicated by the dotted line 13, a dielectric window is formed, and a rectangular waveguide 14 having a section indicated by the dotted line 13 is coupled thereto. A strap 12 short-circuits one terminal of the mixer diode 11 for the fundamental wave, and straps 15 and 16 short circuit both terminals of the mixer diode 11 to the conductor on the rear surface of the substrate 4 at a desired transmitting harmonic frequency $n \cdot f_o$ (where n denotes an integer) generated by the mixer diode 11. A strap 17 matches the input impedance of the mixer diode 11 to the fundamental wave $f_o$.

The output waveguide 14 is cut off for frequencies lower than the transmitting wave $n \cdot f_o$, and operates as a high pass filter. The window 13 is selectively matched to the transmitting harmonic frequency $n \cdot f_o$, and attenuates unwanted harmonics in a higher frequency band. Accordingly, the output waveguide 14 transmits only the intended harmonic output, and it radiates microwaves of low power to the outside through a horn antenna 23. The radiated microwaves are reflected by a reflector, such as the road surface, and undergo a Doppler frequency shift $\Delta f$ to become a frequency component $(n \cdot f_o + \Delta f)$. The reflected signal is returned to the mixer diode 11 via the horn antenna 23 and the waveguide 14.

The reflected waves from the reflective object have been subjected to the so-called Doppler frequency shift, and the frequency difference $\Delta f$ of the transmitted and received waves proportional to the velocity of the microwave transmitting and receiving portion with respect to the stationary reflective object is detected by the mixer diode 11. The received signal is applied from an output signal terminal 20 to a load resistor 21 by means of a direct-current return circuit 18 and a strip line 19 and is detected as a Doppler signal.

In the present embodiment, the fundamental wave oscillation frequency $f_o$ is set at 12 GHz, and the 24 GHz transmitting wave output, at the time when the input power of the mixer diode is 0.5 mW and the load resistance is 1 k$\Omega$, is approximately 10 $\mu$W. The fine adjustment of the transmitting power can be made, not only by adjusting the driving power of the mixer or the bias voltage of the Gunn diode 2, but also by adjusting the resistance of the load resistor 21. The sharp adjustment of the transmitting power depends upon the selection of the multiplication order n, and the reduction of the transmitting power is facilitated by utilizing a high-order high frequency.

On the other hand, when the multiplication order n is made very great, the receiving conversion loss of the harmonic mixer increases. Therefore, it is usually suitable to set the multiplication order in the range of n=2 to 5.

The Doppler radar system of this invention utilizes the conversion loss of the multiplier for the reduction of the transmitting power from the mixer driving power, and is therefore characterized in that the variation of the transmitting power with time is much smaller than the fluctuation of the leakage power in the conventional balanced mixer system employing the same frequency for transmission.

A further advantage of the Doppler radar system of this invention is that the oscillation frequency can be made low with respect to the intended transmitting frequency. In general, an oscillator device of lower frequency is easier to manufacture and more stable in operation than one of higher frequency.

That is, according to this invention, a millimeter wave Doppler radar system can be constructed by employing an inexpensive microwave oscillator device without any expensive millimeter wave oscillator device or any special varactor diode for multiplication.

In addition, according to this invention, a microwave or millimeter wave Doppler radar system of high frequency can be constructed by employing an inexpensive transistor of low frequency band as the oscillator device.

Figure 2:
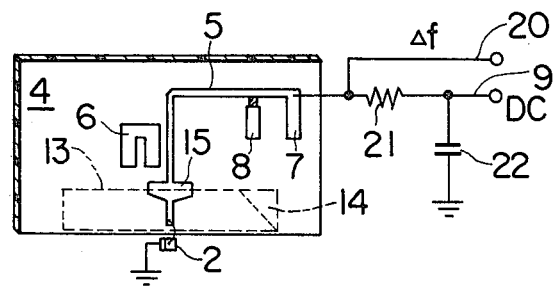
FIG. 2 is a constructional view of the essential portions of another embodiment of the short-range Doppler radar according to this invention.

FIG. 2 is a diagram of a circuit structure showing another embodiment of the short-range Doppler radar system according to this invention. The present embodiment is simplified in such a way that, in place of the mixer diode, the Gunn diode 2 which serves to generate the oscillation signal also carries out the multiplication of the fundamental wave for transmission and the harmonic mixing for reception. The remaining parts are the same as in the embodiment of FIG. 1.

The harmonic waves $n \cdot f_o$ of the Gunn diode 2, which operates at the fundamental wave oscillation frequency $f_o$ determined by the strip line resonator 6, are transmitted from the output waveguide 14 as the transmitting power. Received waves are directly applied to the Gunn diode 2, and a Doppler signal detected by the nonlinearity of the Gunn diode 2 is provided across the load resistor 21. For the load resistor 21, a resistance which is not very high in comparison with the DC resistance of the Gunn diode 2 ought to be selected, and a value on the order of 10$\Omega$ is suggested. For a capacitor 22, a capacitance of at least 100 $\mu$F is employed in order to make the impedance low for the Doppler signal of low frequency.

As set forth above, according to this invention, a Doppler radar system having a transmission power which is low in comparison with the mixer driving power can be constructed with a simple circuit structure, and it is easy to stablize the transmission output.

The Doppler radar system of this invention has its oscillation frequency harmonically coupled with the transmitting output frequency. Therefore, the coupling between the output circuit and the oscillator is low, and the oscillator is extraordinarily stable against external signals or load fluctuations.

While we have shown and described several embodiments in accordance with the present invention, it is to be understood that the invention is not limited thereto but is susceptible of numerous changes and modifications as are known of those of ordinary skill in the art, and we therefore do not wish to be limited to the details shown and described herein but intend to cover all such changes and modifications as are obvious to those skilled in the art.

What is claimed is:

1. A short-range Doppler radar comprising:
   (a) an oscillator;
   (b) a frequency multiplier device which is driven by an output of said oscillator and which forms a range of higher harmonic frequency components of a frequency of the oscillator output;
   (c) filter means for selecting one of the higher harmonic frequency components formed by said frequency multiplier device;
   (d) means for radiating the selected higher harmonic frequency component provided at the output of said filter means and for receiving reflected waves of the radiated component; and (e) means for detecting the Doppler frequency in the received reflected waves.

2. A short-range Doppler radar according to claim 1, wherein a dielectric substrate which forms a micro-integrated circuit including said frequency multiplier device and a micro strip line for coupling the output of said oscillator to said frequency multiplier device is mounted on an inner wall of a metallic package, and said filter means is made up of a window provided in said dielectric substrate and the adjacent wall of said metallic package and a waveguide coupling said window and said radiating means.

3. A short-range Doppler radar according to claims 1 or 2, wherein said frequency multiplier device is a mixer diode.

4. A short-range Doppler radar according to claims 1 or 2, wherein said oscillator and said frequency multiplier device are unitarily constructed of a single Gunn diode.

5. A short-range Doppler radar according to claim 1, wherein said filter means includes a narrow band filter capable of passing a higher harmonic frequency component equal to nfo, where fo is the frequency of the oscillator output and n is an integer in the range of 2 to 5 inclusive.

6. A short-range Doppler radar according to claim 1, wherein said radiating means is a horn antenna.

7. A short-range Doppler radar according to claims 1 or 2, wherein said oscillator comprises a Gunn diode.

8. A short-range Doppler radar comprising microwave signal generating means for generating a fundamental frequency signal and a range of higher harmonic frequency components thereof; filter means connected to said signal generating means for passing only a selected harmonic frequency component; antenna means for radiating said selected harmonic frequency component and for receiving reflected waves thereof; and means for detecting the Doppler frequency component in the received reflected waves.

9. A short-range Doppler radar comprising microwave signal generating means for generating a fundamental frequency signal and a range of higher harmonic frequency components thereof; filter means connected to said signal generating means for passing only a selected harmonic frequency component; antenna means for radiating said selected harmonic frequency component and for receiving reflected waves thereof; means for detecting the Doppler frequency component in the received reflected waves, and a dielectric substrate having a metallic layer on one side thereof and having a micro-integrated circuit formed on the other side thereof, which circuit comprises said microwave signal generating means.

10. A short-range Doppler radar according to claim 9, wherein said filter means comprises a window provided in said dielectric substrate and a waveguide coupling said window to said antenna means.

11. A short-range Doppler radar according to claim 9, wherein said filter means includes a narrow band filter capable of passing a higher harmonic frequency component equal to nfo, where fo is the frequency of said fundamental frequency signal and n is an integer in the range of 2 to 5 inclusive.

12. A short-range Doppler radar according to claim 11, wherein said window is dimensioned to pass frequencies in a range of n·fo and below, and said waveguide is dimensioned to pass frequencies of nfo and above.

13. A short-range Doppler radar according to claim 8, wherein said microwave signal generating means comprises an oscillator generating said fundamental frequency signal and a frequency multiplier device connected to said oscillator for generating said range of higher harmonic frequency components.

14. A short-range Doppler radar according to claim 13, wherein said frequency multiplier device is a mixer diode.

15. A short-range Doppler radar according to claim 9, wherein said microwave signal generating means comprises a single Gunn diode.

16. A short-range Doppler radar comprising
an oscillator which generates a fundamental frequency wave;
a mixer diode which is driven by an output of said oscillator and generates a range of higher harmonic frequency components of said fundamental frequency wave and mixes said fundamental frequency wave with received reflected waves;
filter means for passing only a selected harmonic frequency component of the output generated by said mixer diode;
antenna means coupled to said mixer diode for radiating said selected harmonic frequency component and for receiving reflected waves thereof;
and means connected to said mixer diode for selecting the Doppler frequency in the received reflected waves.

17. A short-range Doppler radar according to claim 16, including a dielectric substrate having a metallic layer on one side thereof and a micro-integrated circuit formed on the other side thereof, which circuit at least comprises said mixer diode and said selecting means.

18. A short-range Doppler radar according to claim 17, wherein said filter means comprises a window provided in said dielectric substrate and a waveguide coupling said window to said antenna means.

19. A short-range Doppler radar according to claim 17, wherein said filter means includes a narrow band filter capable of passing a higher harmonic frequency component equal to n·$f_o$, wherein $f_o$ is the frequency of said fundamental frequency wave and n is an integer in the range of 2 to 5 inclusive.

20. A short-range Doppler radar according to claim 18, wherein said window is dimensioned to pass frequencies in a range of n·$f_o$ and below, and said waveguide is dimensioned to pass frequencies in a range of n·$f_o$ and above.

21. A short-range Doppler radar according to claim 17, wherein said mixer diode is a Gunn diode.

22. A short-range Doppler radar comprising
generating means including a diode for generating a fundamental frequency wave and a range of higher harmonic frequency components of said fundamental frequency wave and for mixing said fundamental wave with received reflected waves;
filter means for passing only a selected harmonic frequency component of the waves generated by said generating means;
antenna means coupled to said diode for radiating said selected harmonic frequency component and for receiving reflected waves thereof; and
means connected to said diode for selecting the Doppler frequency in the received reflected waves.

23. A short-range Doppler radar according to claim 22, including a dielectric substrate having a metallic layer on one side thereof and a micro-integrated circuit formed on the other side thereof, which circuit at least comprises said selecting means.

24. A short-range Doppler radar according to claim 23, wherein said filter means comprises a window provided in said dielectric substrate and a waveguide connected to said window.

25. A short range Doppler radar according to claim 23, wherein said filter means includes a narrow band filter capable of passing a higher harmonic frequency component equal to $n \cdot f_o$, where $f_o$ is the frequency of said fundamental frequency wave and n is an integer in the range of 2 to 5 inclusive.

26. A short-range Doppler radar according to claim 23, wherein said diode is a Gunn diode.

27. A short-range Doppler radar comprising microwave signal generating means for generating a fundamental frequency signal and a range of higher harmonic frequency components thereof; filter means connected to said signal generating means for passing only a selected harmonic frequency component; antenna means for radiating said selected harmonic frequency component and for receiving reflected waves thereof; means for detecting the Doppler frequency component in the received reflected waves, and wherein said microwave signal generating means comprises a single Gunn diode.

* * * * *